US008446529B2

(12) United States Patent
Yokoyama

(10) Patent No.: US 8,446,529 B2
(45) Date of Patent: May 21, 2013

(54) IMAGE DISPLAY APPARATUS

(75) Inventor: Toshihiko Yokoyama, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 406 days.

(21) Appl. No.: 12/616,626

(22) Filed: Nov. 11, 2009

(65) Prior Publication Data
US 2010/0118184 A1 May 13, 2010

(30) Foreign Application Priority Data

Nov. 12, 2008 (JP) ................................. 2008-290244

(51) Int. Cl.
H04N 5/44 (2006.01)
H04N 5/46 (2006.01)
H04N 7/01 (2006.01)
H04N 11/20 (2006.01)
G09G 5/00 (2006.01)

(52) U.S. Cl.
USPC ............ 348/561; 348/558; 348/445; 345/660

(58) Field of Classification Search
None
See application file for complete search history.

(56) References Cited

U.S. PATENT DOCUMENTS 5,675,390 A * 10/1997 Schindler et al. ............. 715/717
2005/0219269 A1 10/2005 Sakashita
2006/0017844 A1 * 1/2006 Iwaki ............................ 348/445
2007/0242159 A1 * 10/2007 Iwaki ............................ 348/558
2008/0001972 A1 * 1/2008 Callway et al. ............... 345/660

FOREIGN PATENT DOCUMENTS

EP 1 619 889 A2 1/2006
JP 2006-303628 A 11/2006

OTHER PUBLICATIONS

Extended European Search Report issued in corresponding European Patent Application No. 09175846.6 dated Dec. 3, 2010.

* cited by examiner

Primary Examiner — Jefferey Harold
Assistant Examiner — Sean Haiem
(74) Attorney, Agent, or Firm — Rossi, Kimms & McDowell LLP

(57) ABSTRACT

The image display apparatus is capable of receiving a first video signal and image data. The apparatus includes a first electronic zoom processing part performing first electronic zoom processing on the first video signal to output a first electronic zoom processed video signal of a predetermined resolution, a video converting part converting the image data into a second video signal, a second electronic zoom processing part performing second electronic zoom processing on the second video signal to output a second electronic zoom processed video signal of the predetermined resolution, and a displaying part displaying an image corresponding to each of the first and second electronic zoom processed video signals. The second electronic zoom processed video signal output from the second electronic zoom processing part is input to the displaying part through the first electronic zoom processing part without being subjected to the first electronic zoom processing.

6 Claims, 6 Drawing Sheets

IMAGE DISPLAY APPARATUS

BACKGROUND OF THE INVENTION

The present invention relates to an image display apparatus such as a projector, a television and a monitor.

Such an image display apparatus is capable of receiving video signals having various resolutions (XGA, SXGA, UXGA, NTSC, PAL and a high-definition signal, etc.) output from personal computers and various video devices. The image display apparatus transforms the received video signal into a signal having a unique resolution displayable on its displaying part such as an LCD.

Further, the image display apparatus has a function of performing electronic zoom processing which includes partial expansion (enlargement) processing, display aspect ratio transformation processing and overscan display processing.

Moreover, there is an image display apparatus capable of receiving image data (file data) generated by an image pickup apparatus such as a digital camera and a video camera. Such an image display apparatus converts the received image data into a video signal, and supplies the video signal to its displaying part such that an image corresponding to the received image data is displayed thereon.

In a case where the received image data is compressed image data of JPEG format, MPEG format or others, the image display apparatus decompresses the compressed image data, converts the decompressed image data into the video signal, and then transforms resolution of the video signal to display resolution of the displaying part. In other words, even when the decompressed image data (video signal) has a high resolution (for example, QXGA), it is transformed into a low resolution such as XGA which is the display resolution of the displaying part for enabling display on the displaying part.

In such a case, the electronic zoom processing is performed on the video signal of the low resolution corresponding to the display resolution of the displaying part. Therefore, the electronic zoom processing makes the resolution of the image subjected to the electronic zoom processing (electronic zoom image) to be displayed extremely lower than the high resolution of the original image, which prevents a sufficient utilization of the original high resolution image data.

An image display apparatus disclosed in Japanese Patent Laid-Open No. 2006-303628 transforms, when performing multi-screen display, plural received signals whose resolutions are different from each other into signals having a same resolution (fixed low resolution) in a first resolution transforming part. Then, the apparatus transforms the fixed low resolution of each received signal into display resolution of its displaying part in a second resolution transforming part.

However, the image display apparatus disclosed in Japanese Patent Laid-Open No. 2006-303628 cannot suppress deterioration of the resolution of the image caused by the electronic zoom processing. This is because the electronic zoom processing is performed on the fixed low resolution video signal output from the first resolution transforming part.

SUMMARY OF THE INVENTION

The present invention provides an image display apparatus capable of suppressing the deterioration of the resolution of the electronic zoom image to be displayed as compared with the original image data.

The present invention provides as one aspect thereof an image display apparatus capable of receiving a first video signal and image data that is not a video signal. The apparatus includes a first electronic zoom processing part configured to perform first electronic zoom processing on the first video signal to output a first electronic zoom processed video signal of a predetermined resolution, a video converting part configured to convert the image data into a second video signal, a second electronic zoom processing part configured to perform second electronic zoom processing on the second video signal from the video converting part to output a second electronic zoom processed video signal of the predetermined resolution, and a displaying part configured to display an image corresponding to each of the first electronic zoom processed video signal output from the first electronic zoom processing part and the second electronic zoom processed video signal output from the second electronic zoom processing part. The second electronic zoom processed video signal output from the second electronic zoom processing part is input to the displaying part through the first electronic zoom processing part without being subjected to the first electronic zoom processing.

The present invention provides as another aspect thereof an image display apparatus capable of receiving a first video signal and a second electronic zoom processed video signal of a predetermined resolution output from an image input apparatus. The image input apparatus includes a video converting part configured to convert image data into a second video signal and a second electronic zoom processing part configured to perform second electronic zoom processing on the second video signal from the video converting part to output the second electronic zoom processed video signal. The image display apparatus includes a first electronic zoom processing part configured to perform first electronic zoom processing on the first video signal to output a first electronic zoom processed video signal of the predetermined resolution, and a displaying part configured to display an image corresponding to each of the first electronic zoom processed video signal output from the first electronic zoom processing part and the second electronic zoom processed video signal output from the second electronic zoom processing part. The second electronic zoom processed video signal output from the second electronic zoom processing part is input to the displaying part through the first electronic zoom processing part without being subjected to the first electronic zoom processing.

The present invention provides as still another aspect thereof an image input apparatus capable of outputting a video signal to an image display apparatus. The image display apparatus is capable of receiving a first video signal and image data that is not a video signal. The image input apparatus includes a video converting part configured to convert the image data into a second video signal, and a second electronic zoom processing part configured to perform second electronic zoom processing on the second video signal from the video converting part to output a second electronic zoom processed video signal of a predetermined resolution. The image input apparatus outputs the second electronic zoom processed video signal to the image display apparatus. The image display apparatus includes a first electronic zoom processing part configured to perform first electronic zoom processing on the first video signal to output a first electronic zoom processed video signal of the predetermined resolution, and a displaying part configured to display an image corresponding to each of the first electronic zoom processed video signal output from the first electronic zoom processing part and the second electronic zoom processed video signal output from the second electronic zoom processing part. The second electronic zoom processed video signal output from the second electronic zoom processing part is input to the displaying part through the first electronic zoom processing part without being subjected to the first electronic zoom processing.

Other aspects of the present invention will be apparent from the embodiments described below with reference to the drawings.

DESCRIPTION OF THE EMBODIMENTS

Exemplary embodiments of the present invention will hereinafter be described with reference to the accompanying drawings.

Embodiment 1

Figure 1:
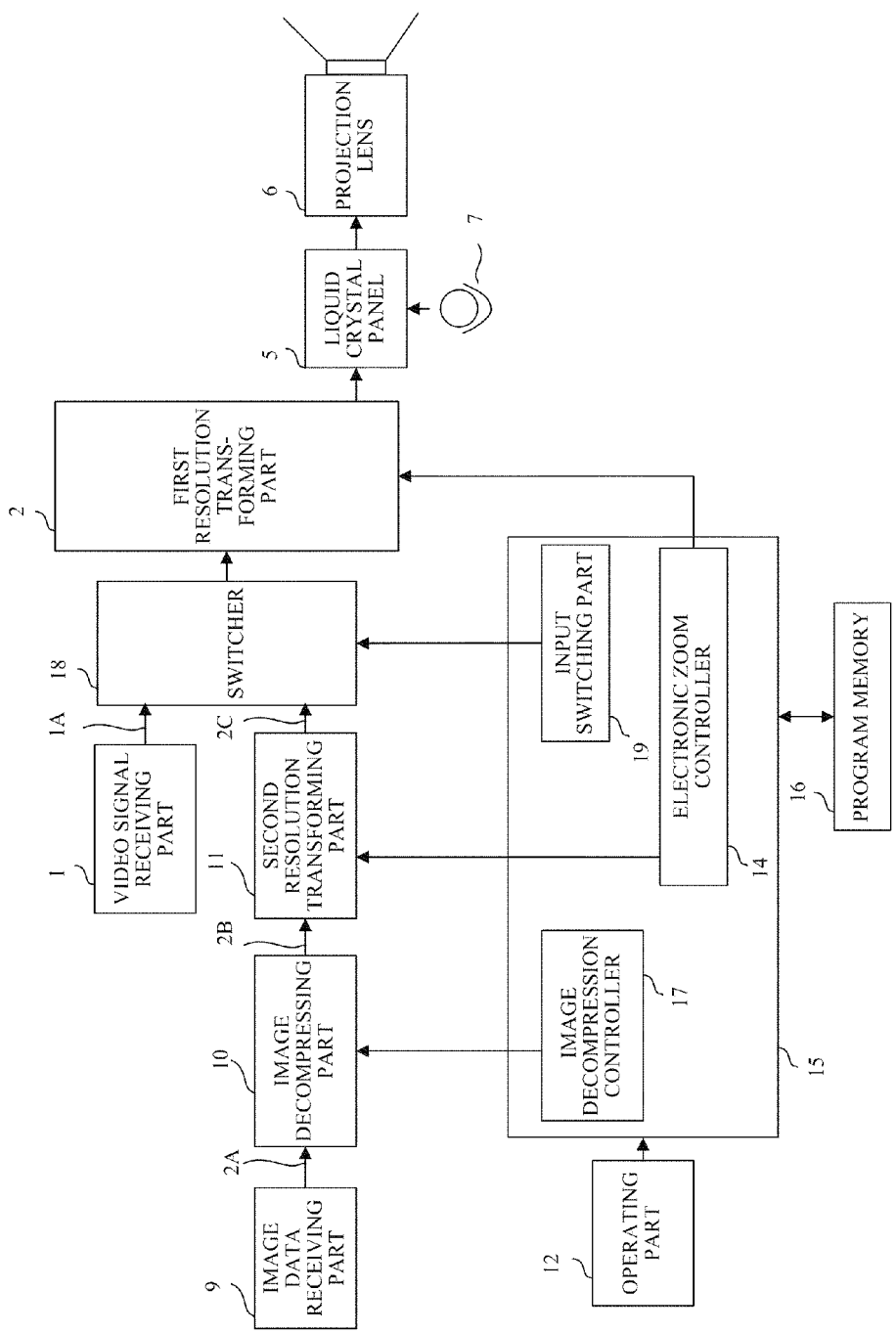
FIG. 1 is a block diagram showing a configuration of a projector that is Embodiment 1 of the present invention.

FIG. 1 shows a configuration of a liquid crystal projector as an image display apparatus that is a first embodiment (Embodiment 1) of the present invention.

The projector includes a video signal receiving part 1 capable of receiving a video signal (first video signal) through a cable (not shown) or others, a switcher 18, a first resolution transforming part (first electronic zoom processing part) 2 and a liquid crystal panel 5 which is an image-forming element (image modulation element) constituting a displaying part. Moreover, the projector includes a light source lamp 7 emitting light for illuminating the liquid crystal panel 5 and a projection lens (projection optical system) 6 projecting light modulated by the liquid crystal panel 5 onto a projection surface such as a screen.

In addition, the projector includes an image data receiving part 9 capable of receiving compressed image data of JPEG format, MPEG format or others, or non-compressed image data. The "image data" in this description is data of a file format which is not a video signal format. In other words, the "image data" is not a video signal. Further, the "image data" includes still image data, moving image data and combined data thereof. The image data is input to the image data receiving part 9 through a recording medium such as a USB memory and a semiconductor memory card.

The projector further includes an image decompressing part 10, a second resolution transforming part (second electronic zoom processing part) 11, a controller 15, an operating part 12 and a program memory 16.

An analog or digital video signal input to the video signal receiving part 1 from an image supply apparatus (not shown) such as a personal computer, a DVD player and a television tuner is input to the switcher 18, and then is input to the first resolution transforming part 2 through the switcher 18.

The first resolution transforming part 2 distinguishes a format of the input video signal such as resolution, and performs resolution transformation processing and frame rate transformation processing to generate an output video signal having a predetermined resolution appropriate for drive of the liquid crystal panel 5. Then, the first resolution transforming part 2 supplies the output video signal to the liquid crystal panel 5. The image supply apparatus inputs to the first resolution transforming part 2 video signals having various resolutions from VGA (640×480) to UXGA (1600×1200). The first resolution transforming part 2 uniformly transforms the input video signals of such various resolutions into a video signal of XGA (1024×768) that is display resolution (predetermined resolution) of the liquid crystal panel 5. Such processing is generally referred to as "resolution transformation processing".

Moreover, the first resolution transforming part 2 performs, in response to an command signal from an electronic zoom controller 14 described later, electronic zoom processing (first electronic zoom processing) including partial expansion (enlargement) processing, overscan processing, display aspect ratio transformation processing and others on the video signal.

The partial expansion processing for enlarging a partial area of an image without changing a displaying screen size is generally called as "electronic zoom processing". However, in this description, the electronic zoom processing in a broad sense includes not only the partial expansion processing, but also the overscan processing, the display aspect ratio transformation processing and others. In addition, the first resolution transforming part 2 performs electronic shift processing such as rotation processing and shift processing on the input video signal. The rotation processing requires processing equivalent to the electronic zoom processing as described later, so that it can be said as one of the electronic zoom processing.

The light from the light source lamp 7 is separated into three color light components of R, G and B by a color separating optical system (not shown). Although only one liquid crystal panel 5 is shown in the figure, three liquid crystal panels for R, G, and B are actually provided. The R, G and B light components respectively modulated by the three liquid crystal panels 5 for R, G, and B are color-combined by a color combining optical system (not shown), and the combined light enters the projection lens 6 to be projected onto the projection surface. A color image is thus displayed on the projection surface.

The liquid crystal panel 5 may be a transmissive liquid crystal panel and a reflective liquid crystal panel. In place of the liquid crystal panel, other image-forming elements (for example, a micro mirror device) can be used.

The controller 15 is constituted by a program-controllable processor unit including a CPU, a RAM, a ROM and others. The controller 15 governs control of the entire projector according to computer programs stored in the program memory 16.

The electronic zoom controller 14 in the controller 15 controls the partial expansion processing on the video signal performed by the first resolution transforming part 2 according to an electronic zoom operation signal input from the operating part 12. The electronic zoom operation signal specifies an expansion magnification and a partial image area to be expanded in the partial expansion processing. The electronic zoom controller 14 also controls the overscan processing, the display aspect ratio transformation processing and the others performed by the first resolution transforming part 2.

The image decompressing part 10 is constituted by a program-controllable processor unit including a CPU, a RAM, a ROM and others. In a case where the image data input through the image data receiving part 9 is compressed image data, the image decompressing part 10 decompresses (expands) the compressed image data to generate non-compressed image data. Further, the image decompressing part 10 serves as a video converting part that converts the image data into a video signal having a same resolution as that of the image data to output the video signal to the second resolution transforming part 11.

The second resolution transforming part 11 has basically the same function of performing the resolution transformation processing, the frame rate transformation processing, the electronic zoom processing (second electronic zoom processing) and the electronic shift processing as the first resolution transforming part 2. However, a video signal input to the second resolution transforming part 11 is a video signal converted from the image data by the image decompressing part 10. The electronic zoom controller 14 controls the partial expansion processing of the video signal in the second resolution transforming part 11 in response to input of the electronic zoom operation signal from the operating part 12. Moreover, the electronic zoom controller 14 controls the overscan processing, the display aspect ratio transformation processing and the others performed in the second resolution transforming part 11.

The video signal from the second resolution transforming part 11 is input to the first resolution transforming part 2 through the switcher 18. The first resolution transforming part 2 uniformly transforms, as described above, the received video signal into the video signal of XGA (1024×768) which is the display resolution of the liquid crystal panel 5. In the same way, the second resolution transforming part 11 also transforms the video signal to be output to the first resolution transforming part 2 into the video signal of XGA which is the display resolution of the liquid crystal panel 5 in advance. In other words, the second resolution transforming part 11 outputs the video signal of XGA regardless of the resolution of the image data input through the image data receiving part 9.

Figure 4:
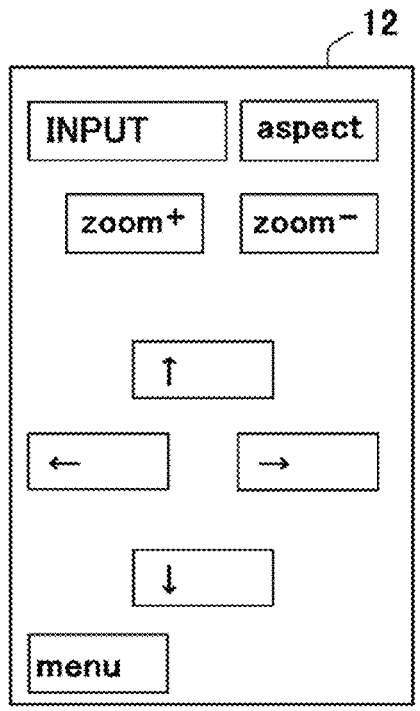
FIG. 4 shows an operating part provided in the projector of Embodiment 1.

FIG. 4 shows an example of the operating part 12. The operating part 12 is constituted by an operating panel and a remote controller for controlling operations of the projector from the outside. The operating part 12 inputs an operation signal corresponding to a user's operation to the controller 15.

The operating part 12 shown in FIG. 4 is provided with an "INPUT" key (input switching key) through which the user selects a signal to be input to the projector from the video signal and the image data. Further, the operating part 12 is provided with "zoom+" and "zoom−" keys through which the user selects the expansion magnification in the partial expansion processing. In addition, the operating part 12 is provided with "up", "down", "left" and "right" keys through which the user selects the partial image area (that is, the user shifts the partial image area in up, down, left and right directions).

Next, description will be made of processing for projecting (displaying) an image corresponding to the compressed image data input to the projector of this embodiment with reference to FIG. 2. The controller 15 performs this processing according to the computer program stored in the program memory 16.

At step 301 (hereinafter abbreviated as "S"), when the image data is selected through the operation of the input switching key in the operating part 12, the controller 15 controls the switcher 18 to cause it to set a signal input line to the projector to an image data input line 2A→2B→2C. Reference character 2A denotes an input line from the image data receiving part 9 to the image decompressing part 10. Reference character 2B denotes an input line from the image decompressing part 10 to the second resolution transforming part 11. Reference character 2C denotes an input line from the second resolution transforming part 11 to the switcher 18.

When the video signal is selected through the operation of the input switching key in the operating part 12, the controller 15 controls the switcher 18 to cause it to set the signal input line to the projector to a video signal input line 1A. The video signal input line 1A is used as an input line from the video signal receiving part 1 to the switcher 18.

Next, at S302, the image data receiving part 9 reads out the compressed image data recorded in the recording medium.

Next, at S303, the controller 15 controls through an image decompression controller 17 included therein the image decompressing part 10 to cause it to decompress the compressed image data to generate non-compressed image data. In this embodiment, the non-compressed image data is data of a file format such as a bit map format having a resolution of QXGA (2048×1536). The projector cannot display the non-compressed image data of QXGA directly. In general, image data of QXGA is high resolution image data that cannot be received by normal projectors. Therefore, the image decompressing part 10 converts the non-compressed image data of QXGA into a video signal (second video signal) of QXGA which is the same resolution of the non-compressed image data.

At S304, the second resolution transforming part 11 transforms the video signal of QXGA input from the image decompressing part 10 into a video signal of a resolution of XGA (1027×768) which is the display resolution of the liquid crystal panel 5, and then outputs it.

Thus, even when the input (received) image data has a higher resolution than XGA, the second resolution transforming part 11 certainly transforms the resolution into XGA that is the display resolution of the liquid crystal panel 5.

This embodiment describes the case where the image decompressing part 10 transforms the image data into the video signal, and the second resolution transforming part 11 performs the resolution transformation on the video signal. However, the following processing may be employed. The image decompressing part 10 inputs image data to the second resolution transforming part 11, and the second resolution transforming part 11 performs resolution transformation on the image data. Then, the second resolution transforming part 11 converts the image data subjected to the resolution transformation to the video signal. In this case, the second resolution transforming part 11 serves as the video converting part.

Next, at S305, the controller 15 sets a mode of the first resolution transforming part 2 to a mode in which the resolution transformation is not performed. As a result, the video signal of XGA from the second resolution transforming part 11 is output without change to the liquid crystal panel 5 through the switcher 18 and the first resolution transforming part 2. An image corresponding to the video signal of XGA is thus projected and displayed on the projection surface.

Figure 3:
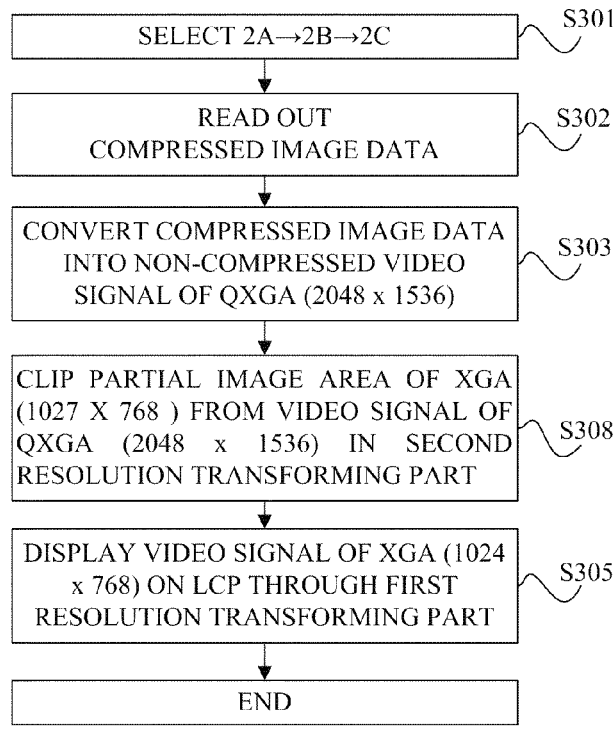
FIG. 3 is a flow chart showing electronic zoom processing for an electronic zoom magnification of 2 times in Embodiment 1

Next, description will be made of the partial expansion processing that is one of the electronic zoom processing in this embodiment with reference to FIG. 3. A case where the expansion magnification (electronic zoom magnification) is set to 2 times (hereinafter abbreviated as "x") through the operating part 12 will be described. The controller 15 also performs this processing according to the computer program stored in the program memory 16.

Figure 2:
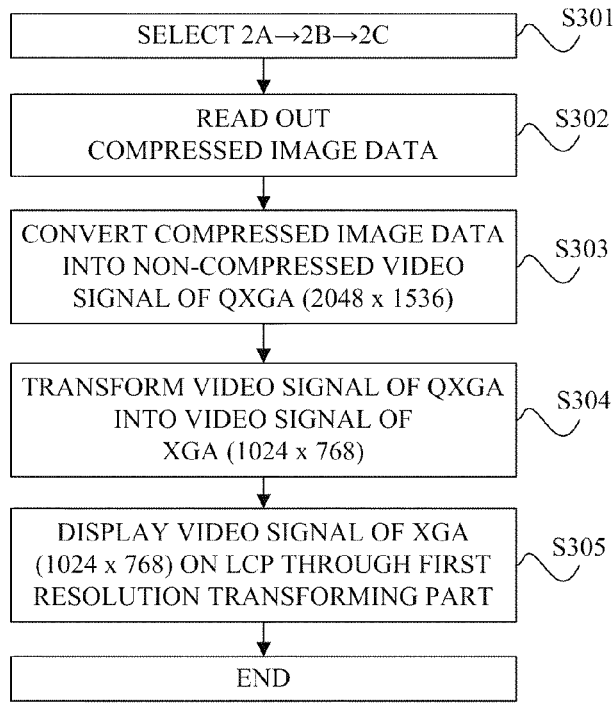
FIG. 2 is a flowchart showing processing for displaying compressed image data in Embodiment 1.

Processes from S301 to S303 are the same as those from S301 to S303 in FIG. 2. At S303, as described above, the compressed image data is decompressed to generate the non-compressed image data of the file format such as the bit map format having the resolution of QXGA (2048×1536), and the non-compressed image data is then converted into the video signal of QXGA.

At S308, since the expansion magnification is 2×, the electronic zoom controller 14 in the controller 15 causes the second resolution transforming part 11 to clip (extract) a partial image area of XGA (1027×768) which is half resolution in each of horizontal and vertical directions of the video signal of QXGA.

Next, at S305, the second resolution transforming part 11 outputs a video signal of the clipped partial image area to the first resolution transforming part 2 through the switcher 18. The first resolution transforming part 2 outputs the video signal of XGA without performing the resolution transformation processing thereon to the liquid crystal panel 5. As a result, the electronic zoom image corresponding to the video signal having the resolution of XGA which has been subjected to the electronic zoom processing (partial expansion processing) in the second resolution transforming part 11 is projected and displayed. The video signal which has been subjected to the electronic zoom processing in the second resolution transforming part 11 corresponds to "second electronic zoom processed video signal".

Such processing enables, as compared with a case where the electronic zoom processing is performed on a video signal of QXGA converted from high resolution image data of QXGA in the first resolution transforming part 2, display of an electronic zoom image with less deterioration in resolution with respect to the image data.

Resolution deterioration rates of the electronic zoom image to the non-compressed image data when the expansion magnifications in the electronic zoom processing are 2×, 3× and 4× in the second resolution transforming part 11 are as follows:

Expansion magnification: Resolution of non-compressed image data (QXGA) in horizontal direction
  (1) Clipping in electronic zoom processing
  (2) Transformation (enlargement) to resolution (XGA) of liquid crystal panel in electronic zoom processing
  Resolution deterioration rate of electronic zoom image to non-compressed image data
  2×: 2048
  (1) 2048/2=1024
  (2) Enlargement from 1024 to 1024 (no change)
  ½
  3×: 2048
  (1) 2048/3=approximately 683
  (2) Enlargement from 683 to 1024 (approximately 1/1.5)
  approximately 1/4.5
  4×: 2048.
  (1) 2048/4=512
  (2) Enlargement from 512 to 1024 (½).
  ⅛

In contrast thereto, in a conventional configuration, electronic zoom processing is performed on a video signal of XGA converted from non-compressed image data of QXGA in a first resolution transforming part. The resolution deterioration rates of the electronic zoom image to the non-compressed image data when the expansion magnifications in the electronic zoom processing are 2×, 3× and 4× are as follows:
  2×: 2048.
  (1) Transformation from 2048 to 1024 (½)
  (2) 1024/2=512

(3) Enlargement from 512 to 1024 (½).
  ⅛
  3×: 2048.
  (1) Transformation from 2048 to 1024 (½)
  (2) 1024/3=approximately 341
  (3) Enlargement from 341 to 1024 (approximately ⅓)
  approximately 1/18
  4×: 2048
  (1) Transformation from 2048 to 1024 (½)
  (2) 1024/4=256
  (3) Enlargement from 256 to 1024 (¼)
  1/32

As described in this embodiment, performing the electronic zoom processing on the high resolution image data in the second resolution transforming part 11 enables suppression of deterioration in resolution of the actually displayed electronic zoom image with respect to the high resolution of the image data. This enables projection and display of a high quality electronic zoom image which is obtained from high resolution image data (for example, image data generated by a digital camera capable of high resolution image pickup).

Figure 5:
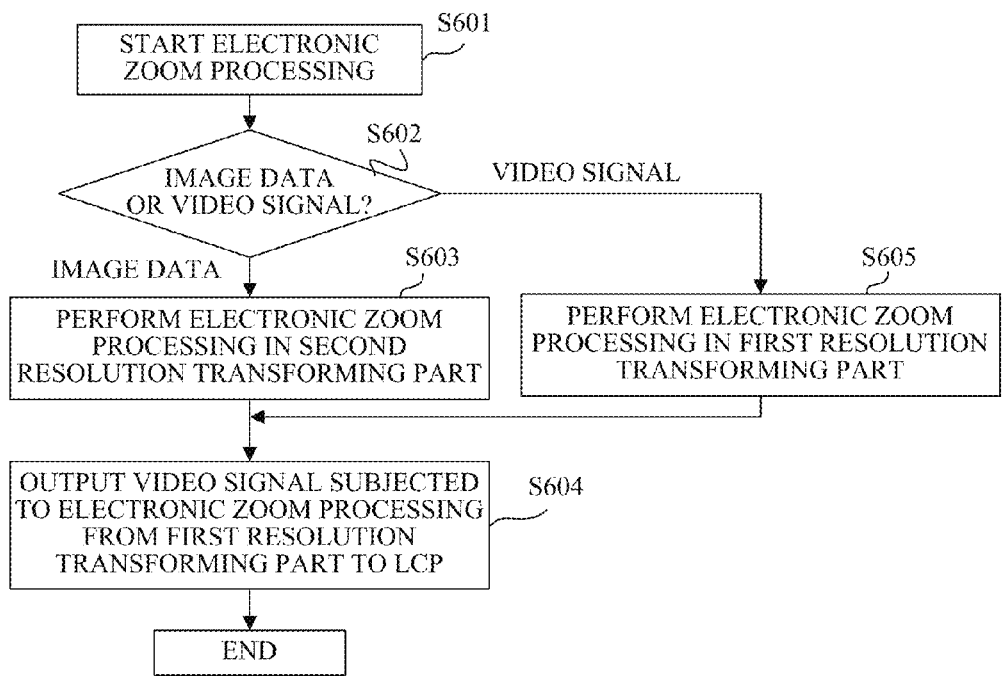
FIG. 5 is a flowchart showing processing relating to an electronic zoom operation in Embodiment 1.

Description will be next made of processing relating to electronic zoom operations in the operating part 12 with reference to FIG. 5. This processing is also performed by the controller 15 according to the computer program stored in the program memory 16.

First, at S601, when the "zoom+" or "zoom−" key is pushed in the operating part 12, the electronic zoom controller 14 starts the electronic zoom processing. The electronic zoom controller 14 sets the electronic zoom magnification (expansion magnification) according to the operation of the "zoom+" or "zoom−" key.

Next, at S602, the input switching part 19 determines which one of the image data (second signal) and the video signal (first signal) is selected as an input signal through an input switching key in the operating part 12. If the video signal is selected, the process proceeds to S605. If the image data is selected, the process proceeds to S603.

At S605, the electronic zoom controller 14 instructs to the first resolution transforming part 2 the electronic zoom processing with the electronic zoom magnification set at S601. The first resolution transforming part 2 performs the electronic zoom processing based on the instructed electronic zoom magnification on the input video signal (first video signal). Then, the process proceeds to S604.

The video signal which has been subjected to the electronic zoom processing in the first resolution transforming part 2 corresponds to "first electronic zoom processed video signal".

Then, at S604, the first resolution transforming part 2 outputs the video signal (first or second electronic zoom processed video signal) whose resolution has been transformed into the display resolution of the liquid crystal panel 5 by the electronic zoom processing to the liquid crystal panel 5.

On the other hand, at S603, the electronic zoom controller 14 instructs the electronic zoom processing with the electronic zoom magnification set at S601 to the second resolution transforming part 11. The second resolution transforming part 11 performs, as described using FIG. 3, the electronic zoom processing based on the instructed electronic zoom magnification on the input video signal (second video signal) converted from the image data. Then, the process proceeds to S604.

Although the above description was made of the partial expansion processing as one of the electronic zoom processing, the electronic zoom processing includes the above-described overscan processing and display aspect ratio transformation processing.

Figure 6:
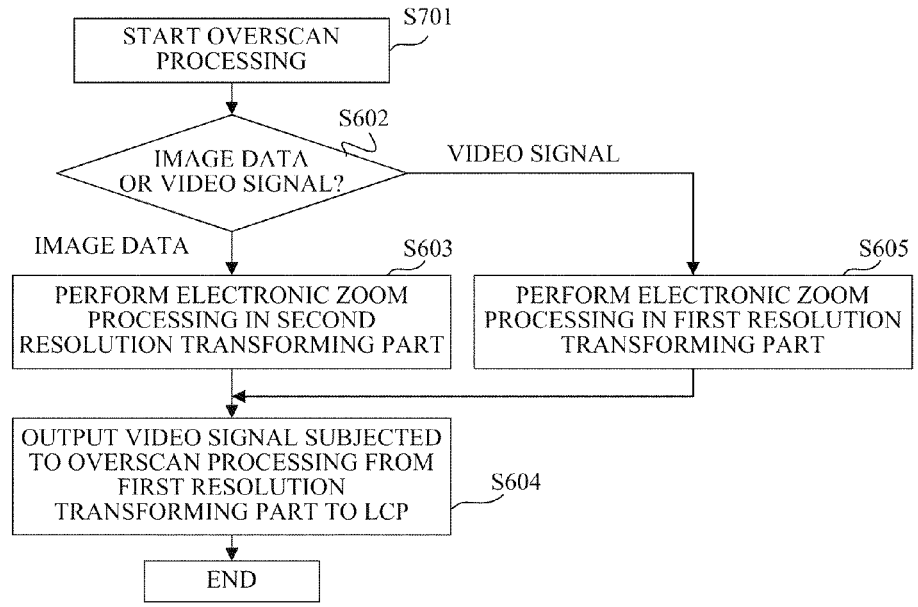
FIG. 6 is a flowchart showing overscan processing in Embodiment 1.

FIG. 6 shows a flow of the overscan processing.

At S701, when a "menu" key is operated in the operating part 12, a menu image is displayed on the projection surface through the liquid crystal panel 5. The menu image includes a display aspect ratio switching tag. Selection of the display aspect ratio switching tag makes an instruction of the overscan processing to the controller 15. The controller 15 starts the overscan processing in response to the instruction. The overscan processing displays a center side area corresponding to, for example, 90% (hereinafter referred to as "central area") of the input image (video signal) on the entire liquid crystal panel 5. The flow of the overscan processing is basically the same as that of the partial expansion processing from S602 to S605. Instead of a peripheral area corresponding to 10% of the input image which is not displayed on the liquid crystal panel 5, the central area is displayed widely. The overscan processing prevents display of noises existing in the peripheral area.

Figure 7:
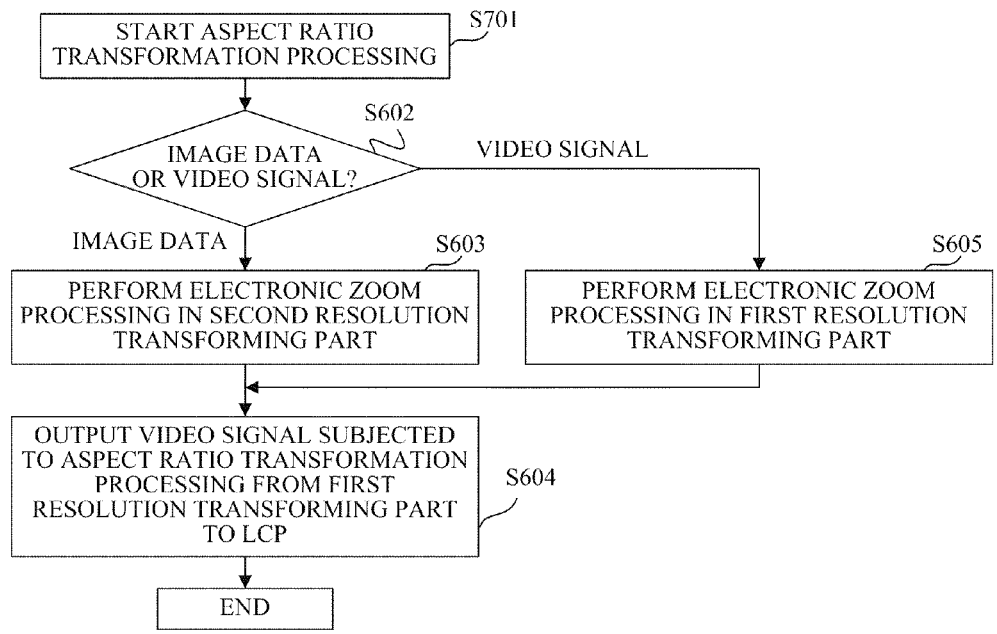
FIG. 7 is a flowchart showing display aspect ratio transformation processing in Embodiment 1.

FIG. 7 shows a flow of the display aspect ratio transformation processing.

At S801, when an "aspect" key is operated in the operating part 12 and thereby a switching instruction of the display aspect ratio is made, the controller 15 starts the display aspect ratio transformation processing according to a specified aspect ratio included in the switching instruction.

Brief description will be made of the display aspect ratio transformation processing. An aspect ratio of the input image (hereinafter referred to as "input aspect ratio") can be set to various values. For example, the input aspect ratio is 16:9 in high-definition television, or 4:3 in NTSC. On the other hand, the aspect ratio of the display image of the projector can be selected from 16:9 and 4:3. Since a difference between the input aspect ratio and the display aspect ratio generates a lack of the display image or reduces the size of the display image, a part of the input image (partial image area) is clipped to be enlarged and displayed. In other words, the display aspect ratio transformation processing performs basically the same processing as that of the partial expansion processing from S602 to S605.

Figure 8:
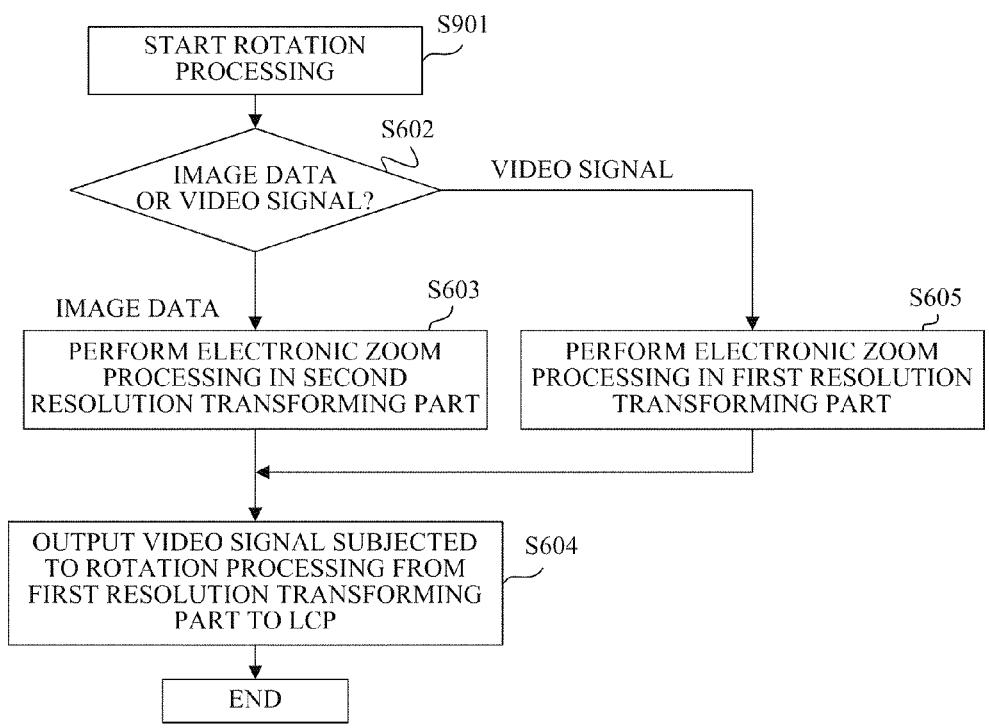
FIG. 8 is a flowchart showing rotation processing in Embodiment 1.

FIG. 8 shows a flow of the rotation processing.

At S901, when the rotation processing is instructed from the operating part 12, the controller 15 starts the rotation processing according to a specified rotation angle included in the rotation processing instruction. The rotation processing rotates the display image by 90 degrees to right and left, and rotates it by 180 degrees (upside down).

Since the rotation processing changes horizontal and vertical resolutions of the input image, a part of the input image (partial image area) is clipped to be enlarged and displayed in order to prevent generation of a lack of the display image and reduction of the display image size. In other words, the rotation processing also performs basically the same processing as that of the partial expansion processing from S602 to S605 though a process to rotate the image is added thereto.

Embodiment 2

Figure 9:
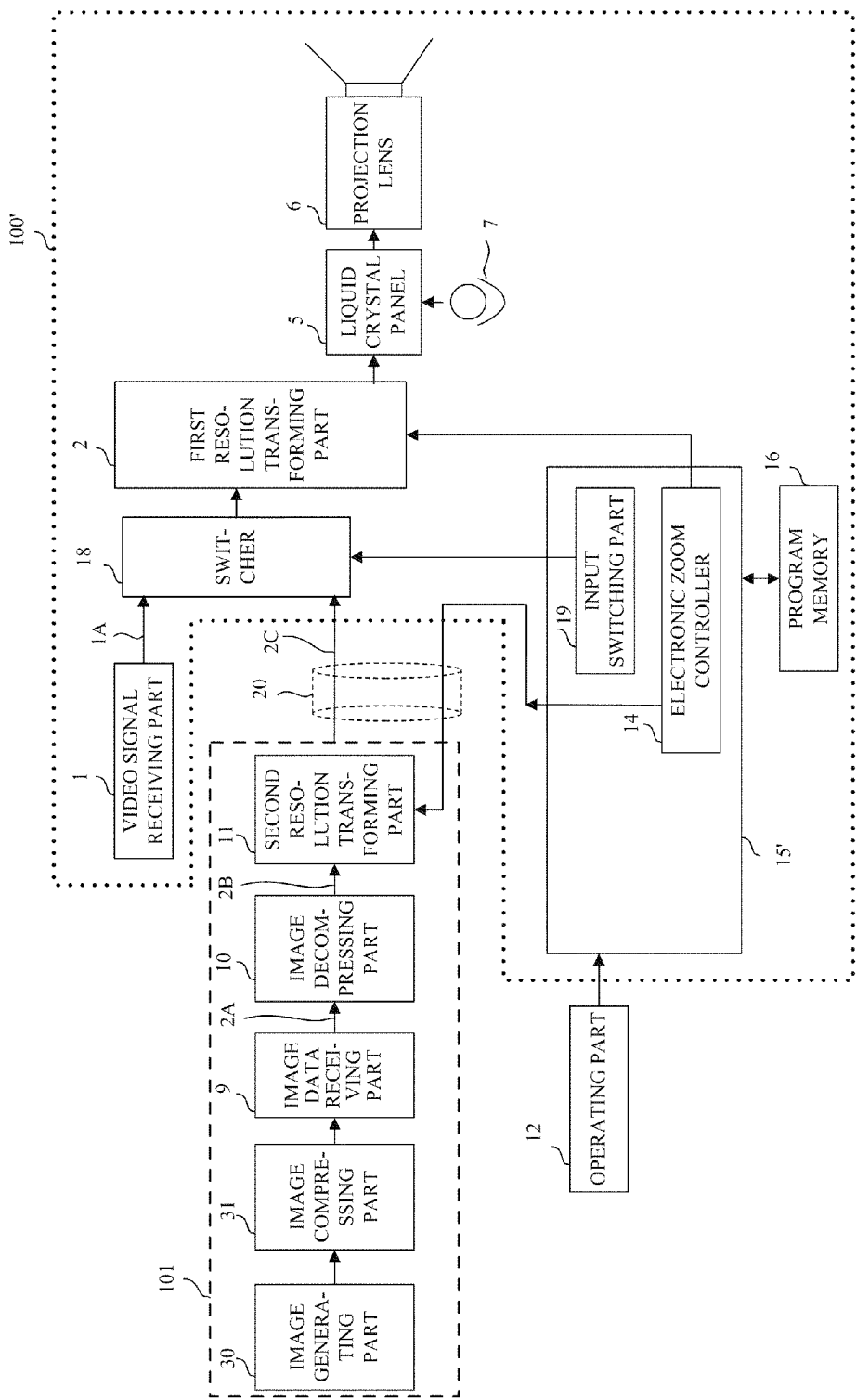
FIG. 9 is a block diagram showing configurations of a projector and a camera in Embodiment 2 of the present invention.

FIG. 9 shows a configuration of a projector that is a second embodiment (Embodiment 2) of the present invention and that of a digital still camera (image pickup apparatus) as an image input apparatus that is also Embodiment 2. The projector 100' of this embodiment includes the video signal receiving part 1, the switcher 18, the first resolution transforming part 2, the operating part 12, the liquid crystal panel 5, the projection lens 6 and the program memory 16 which are the same components as those of the projector 100 of Embodiment 1. The projector 100' of this embodiment further includes a controller 15' which does not include the image decompression controller 17 provided in the controller 15 of the projector 100 of Embodiment 1.

On the other hand, the camera 101 in this embodiment includes the image data receiving part 9, the image decompressing part 10 and the second resolution transforming part 11 which are the same components as those of the projector 100 of Embodiment 1. In addition, the camera 101 includes an image generating part 30 and an image compressing part 31.

The image generating part 30 is constituted by an image pickup element (not shown) such as a CCD sensor or a CMOS sensor which photoelectric converts an object image formed by an image pickup lens (not shown), and an image processing part (not shown) which generates image data (file format data) from an output of the image pickup element.

The image compressing part 31 compresses the image data generated by the image generating part 30 to generate compressed image data. The compressed image data is input to the image data receiving part 9 and sent to the image decompressing part 10 to be decompressed. Non-compressed image data thus generated is converted into a video signal (second video signal) by the image decompressing part 10. The video signal is input to the second resolution transforming part 11.

The camera 101 is connected with the projector 100' through a cable 20 (or wireless communication such as infrared communication). The electronic zoom controller 14 in the projector 100' controls the second resolution transforming part 11 through the cable 20.

A video signal subjected to the electronic zoom processing in the second resolution transforming part 11 in the camera 101 and having a predetermined resolution (that is, a second electronic zoom processed video signal which has been converted from the image data) is output to the liquid crystal panel 5 through the switcher 18 and the first resolution transforming part 2 in the projector 100'.

In this embodiment, the electronic zoom processing on a high resolution image data generated in the camera 101 is performed by the second resolution transforming part 11 in the camera 101. This can suppress deterioration in resolution of an electronic zoom image which is actually projected and displayed by the projector 100' with respect to the resolution of the image data. Thus, this embodiment enables projection and display of a high quality electronic zoom image which is obtained from image data generated by the camera 101 capable of high resolution image pickup.

Although this embodiment described the case where the digital still camera is used as the image input apparatus, other apparatuses such as a video camera, a DVD device and a personal computer may be used as the image input apparatus.

Further, although the above embodiments described the projectors, alternative embodiments of the present invention include other image display apparatuses such as a television and a monitor.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2008-290244, filed on Nov. 12, 2008, which is hereby incorporated by reference herein in its entirety.

What is claimed is:

1. An image display apparatus capable of receiving a first video signal and image data that is not a video signal, the apparatus comprising:
a displaying part configured to display an image;
a first electronic zoom processing part configured to perform first electronic zoom processing on the first video signal to output a first electronic zoom processed video signal of a predetermined resolution, the first electronic zoom processed video signal of the predetermined resolution being a video signal having a predetermined resolution that is lower than that of the first video signal and corresponds to a display resolution of the displaying part;
a video converting part configured to convert the image data into a second video signal having a same resolution as that of the image data;
a second electronic zoom processing part configured to perform second electronic zoom processing on the second video signal from the video converting part to output a second electronic zoom processed video signal of the predetermined resolution, the second electronic zoom processed video signal of the predetermined resolution being a signal having the predetermined resolution that is lower than that of the first video signal and corresponds to the display resolution of the displaying part;
an operating part configured to select a signal to be input to the image display apparatus from the first video signal or the image data, and
a controller configured to, when the image data is selected by the operating part as the signal which is input to the image display apparatus, perform a control so as to switch a signal route so that the image data passes through, in order, the video converting part and the second electronic zoom processing part, and then is input to the first electronic zoom processing part, and to input the second electronic zoom processed video signal output from the second electronic zoom processing part to the displaying part through the first electronic zoom processing part without being subjected to the first electronic zoom processing,
wherein the displaying part is configured to display an image corresponding to each of the first electronic zoom processed video signal output from the first electronic zoom processing part and the second electronic zoom processed video signal output from the second electronic zoom processing part, and
wherein each of the first and second electronic zoom processing is a process to enlarge partial area of an image that the image display apparatus displays without changing a displaying screen size.

2. An image display apparatus according to claim 1,
wherein the image data input to the video converting part is compressed image data, and
wherein the video converting part is configured to decompress the compressed image data to convert the decompressed image data into the second video signal.

3. An image display apparatus according to claim 1,
wherein the apparatus includes a projection optical system projecting the image displayed in the displaying part onto a projection surface.

4. An image display apparatus capable of receiving a first video signal and a second electronic zoom processed video signal of a predetermined resolution output from an image input apparatus, the image input apparatus including a video converting part configured to convert image data into a second video signal having a same resolution as that of the image data and a second electronic zoom processing part configured to perform second electronic zoom processing on the second video signal from the video converting part to output the second electronic zoom processed video signal, the second electronic zoom processed video signal of the predetermined resolution being a signal having the predetermined resolution, the image display apparatus comprising:
a first electronic zoom processing part configured to perform first electronic zoom processing on the first video signal to output a first electronic zoom processed video signal of the predetermined resolution;
an operating part configured to select a signal to be to input to the image display apparatus from the first video signal or the second electronic zoom processed video signal;
a displaying part configured to display an image corresponding to each of the first electronic zoom processed video signal output from the first electronic zoom processing part and the second electronic zoom processed video signal output from the second electronic zoom processing part; and
a controller configured to, when the second electronic zoom processed video signal is selected by the operating part as the signal which is input to the image display apparatus, perform a control so as to switch a signal route so that the second electronic zoom processed video signal is input to the first electronic zoom processing part and to input the second electronic zoom processed video signal output from the second electronic zoom processing part to the displaying part through the first electronic zoom processing part without being subjected to the first electronic zoom processing,
wherein the predetermined resolution is lower than that of the first video signal and corresponds to a display resolution of the displaying part, and
wherein each of the first and second electronic zoom processings is processing to enlarge partial area of an image that the image display apparatus displays without displaying screen size.

5. An image input apparatus capable of outputting a video signal to an image display apparatus, the image display apparatus being capable of receiving a first video signal and image data that is not a video signal, the image input apparatus comprising:
a video converting part configured to convert the image data into a second video signal having a same resolution as that of the image data; and
a second electronic zoom processing part configured to perform second electronic zoom processing on the second video signal from the video converting part to output a second electronic zoom processed video signal of a predetermined resolution,
wherein the image input apparatus outputs the second electronic zoom processed video signal to the image display apparatus, and
wherein the image display apparatus comprises:
a first electronic zoom processing part configured to perform first electronic zoom processing on the first video signal to output a first electronic zoom processed video signal of the predetermined resolution;
an operating part configured to select a signal to be input to the image display apparatus from the first video signal or the image data;
a displaying part configured to display an image corresponding to each of the first electronic zoom processed video signal output from the first electronic zoom processing part and the second electronic zoom processed video signal output from the second electronic zoom processing part, a controller configured to, when the image data is selected by the operating part as the signal which is input to the image display apparatus, perform a control so as to switch a signal route so that the image data passes through, in order, the video converting part and the second electronic zoom processing part, and then is input to the first electronic zoom processing part, and to input the second electronic zoom processed video signal output from the second electronic zoom processing part to the displaying part through the first electronic zoom processing part without being subjected to the first electronic zoom processing, wherein the predetermined resolution is lower than that of the first video signal and corresponds to a display resolution of the displaying part, and wherein each of the first and second electronic zoom processings is processing to enlarge partial area of an image that the image display apparatus displays without changing a displaying screen size.

6. A signal processing method in an image display apparatus capable of receiving a first video signal and image data that is not a video signal, the apparatus including a first electronic zoom processing part, a video converting part, a second electronic zoom processing part, an operating part, a displaying part and a controller, the method comprising the steps of:

causing the first electronic zoom processing part to perform first electronic zoom processing on the first video signal to generate a first electronic zoom processed video signal of a predetermined resolution, the first electronic zoom processed video signal of the predetermined resolution being a video signal having a predetermined resolution that is lower than that of the first video signal and corresponds to a display resolution of the displaying part;

causing the video converting part to convert the image data into a second video signal having a same resolution as that of the image data;

causing the second electronic zoom processing part to perform second electronic zoom processing on the second video signal from the video converting part to generate a second electronic zoom processed video signal of the predetermined resolution the second electronic zoom processed video signal of the predetermined resolution being a signal having the predetermined resolution that is lower than that of the first video signal and corresponds to the display resolution of the displaying part;

causing the operating part to select a signal to be input to the image display apparatus from the first video signal or the image data; and causing the displaying part to display an image corresponding to each of the first electronic zoom processed video signal output from the first electronic zoom processing part and the second electronic zoom processed video signal output from the second electronic zoom processing part, wherein when the image data is selected by the operating part as the signal which is input to the image display apparatus, the controller performs a control so as to switch a signal route so that the image data passes through, in order, the video converting part and the second electronic zoom processing part, and then is input to the first electronic zoom processing part, and inputs the second electronic zoom processed video signal output from the second electronic zoom processing part to the displaying part through the first electronic zoom processing part without being subjected to the first electronic zoom processing, and wherein each of the first and second electronic zoom processing is a process to enlarge partial area of an image that the image display apparatus displays without changing a displaying screen size.

* * * * *